(12) United States Patent
Vyas et al.

(10) Patent No.: US 10,501,629 B2
(45) Date of Patent: Dec. 10, 2019

(54) PROCESS FOR THE PREPARATION OF ISOSULFAN BLUE

(71) Applicant: DISHMAN CARBOGEN AMCIS LIMITED, Navrangpura, Ahmedabad (IN)

(72) Inventors: Janmejay Rajnikant Vyas, Ahmedabad (IN); Yashbir Singh, Ahmedabad (IN); Chiragkumar Chandrakantbhai Patel, Patan (IN); Sandip Babanrao Pawar, Aurangabad (IN); Himani Dhotre, Ahmedabad (IN); K. Narasimha Sarma, Ahmedabad (IN); Dilip N. Patel, Ahmedabad (IN); Renish Ghetiya, Ahmedabad (IN); Babulal R. Patel, Ahmedabad (IN); Sarika P. Deshmukh, Ahmedabad (IN); Girish Mavada, Ahmedabad (IN)

(73) Assignee: DISHMAN CARBOGEN AMCIS LIMITED, Ahmedabad (IN)

( * ) Notice: Subject to any disclaimer, the term of this patent is extended or adjusted under 35 U.S.C. 154(b) by 0 days.

(21) Appl. No.: 16/068,575

(22) PCT Filed: Oct. 1, 2016

(86) PCT No.: PCT/IB2016/055891
§ 371 (c)(1),
(2) Date: Jul. 6, 2018

(87) PCT Pub. No.: WO2017/118882
PCT Pub. Date: Jul. 13, 2017

(65) Prior Publication Data
US 2019/0010330 A1    Jan. 10, 2019

(30) Foreign Application Priority Data
Jan. 9, 2016    (IN) .............................. 201621000866

(51) Int. Cl.
*C09B 11/18* (2006.01)
*C01B 17/98* (2006.01)

(52) U.S. Cl.
CPC .............. *C09B 11/18* (2013.01); *C01B 17/98* (2013.01)

(58) Field of Classification Search
CPC ................................ C01B 17/98; C09B 11/18
See application file for complete search history.

(56) References Cited

U.S. PATENT DOCUMENTS

2008/0293963 A1* 11/2008 Kovi ..................... C07C 303/22
562/46
2013/0310600 A1    11/2013 Kovi et al.

FOREIGN PATENT DOCUMENTS

IN    3509/CHE/2012 A    3/2014

* cited by examiner

*Primary Examiner* — Paul A Zucker
(74) *Attorney, Agent, or Firm* — Volpe and Koenig, P.C.

(57) ABSTRACT

The present invention relates to process for preparation of Isosulfan blue (Formula I) substantially free from desethyl impurity.

26 Claims, No Drawings

PROCESS FOR THE PREPARATION OF ISOSULFAN BLUE

CROSS REFERENCE TO RELATED APPLICATION

This application is a 35 USC § 371 national stage of PCT/IB2016/055891, which was filed Oct. 1, 2016 and claimed priority to IN 201621000866, filed Jan. 9, 2016, both of which are incorporated herein by reference as if fully set forth.

The following specification particularly describes and ascertains the nature of this invention and the manner in which the same is to be performed.

FIELD OF THE INVENTION

The present invention relates to a process for preparation of Isosulfan Blue, which is substantially free of desethyl impurity.

BACKGROUND OF THE INVENTION

Isosulfan Blue, chemically known as N-[4-[4-(diethylamino)phenyl]2,5-disulfophenyl)methylene]2,5-cyclohexadien-1-ylidine]-N-ethylethanaminium sodium salt is represented by Formula (I) and marketed under the brand name LYMPHAZYRIN.

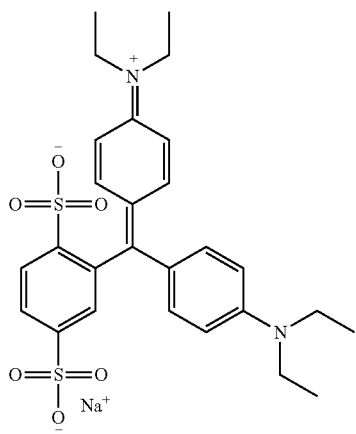

Formula I

Isosulfan blue is a triaryl methane dye used as a cancer diagnostic agent. It is a structural isomer of sulfan blue and belongs to family of triaryl methane dyestuffs.

Most of the currently available preparation methods of triaryl methane dyestuffs involve oxidation of leuco/isoleuco acids as well as leuco/isoleuco bases. The oxidation is carried out by using potassium dichromate, lead dioxide, oxone and chloranil.

U.S. Pat. No. 1,531,507 discloses a process of making intermediate of Isosulfan blue, namely, benzaldehyde-2,5-disulfonic acid. The process involves sulfonation of 2-chloro benzaldehyde using 23% and 65% oleum and neutralization using sodium carbonate to obtain 2-chloro benzaldehyde 5-sulfonic acid, which on treatment with sodium sulfite and sodium bisulfite at reflux temperature and acidifying the reaction mixture using sulfuric acid to obtain Benzaldehyde-2, 5-disulfonic acid. Said method involves tedious neutralization, basification and acidification thus being commercially unviable.

U.S. Pat. No. 4,330,476 discloses a process for making of triaryl methane dyestuff, which involves condensation of benzaldehyde derivative with N,N-Diethyl aniline and urea in glacial acetic acid at 100° C. and in situ oxidation using chloranil and intensive gassing with air. A total mixture of nitrogen oxide and nitrogen dioxide produced by treating sodium nitrite with sulfuric acid is metered into reaction mixture and after completion of reaction evaporation of acetic acid gives dyestuff. This method of preparation generates hazardous gases besides impurity formation, which adversely impacts the yield and purity thus being unviable on commercial scale.

U.S. Pat. No. 5,659,053 discloses a process for the preparation of Sulfan Blue, which involves oxidation of leuco acid in presence of oxygen transfer catalyst that contains complexed heavy metal ion using hydrogen peroxide, hydrogen peroxide donor compound, an organic hydroperoxide or percarboxylic acid as oxidizing agents and oxygen transfer catalyst used as a class of porphyrins, tetraaza[14]annulenes, phthalocyanines or tetraazacyclotetradecanes in water. This method involves costly catalysts and thus being not very feasible on large scale.

U.S. Pat. No. 1,805,925 disclosed a process for preparation of triaryl methane dyestuff, which involves oxidation of leuco acid using copper salt in pyridine and water mixture at 80-120° C. The copper salts used as cupric chloride, cuprous chloride, cupric sulphate. This method of preparation involves use of pyridine, which is not a suitable solvent and thus reaction is carried out at high temperature. Such reaction conditions leads to formation of impurities and causes low yield and low purity.

U.S. Pat. No. 2,726,252 discloses a process for preparation of leuco triaryl methane compound involving condensation of benzaldehyde derivatives with arylamine using auxiliary agent selected from urea, thiourea, their lower alkyl derivatives at 70-120° C. in alcohol using acids selected from hydrochloric, sulfuric, phosphoric, formic, mono-, di- or tri-chloro acetic, benzene sulfonic, p-toluenesulfonic.

U.S. Pat. No. 7,534,911 has disclosed process for preparation of Isosulfan blue in which first step involves sulphonation of 2-chloro benzaldehyde with a sulphonating agent to obtain 2-chloro benzaldehyde 5-sulfonic acid and treating 2-chloro benzaldehyde 5-sulfonic acid with sodium sulphite and subsequent basification to obtain benzaldehyde-2,5-disulfonic acid disodium salt. Condensation of benzaldehyde-2,5-disulfonic acid disodium salt with N, N-diethyl aniline using hydrochloric acid to obtain Isoleuco acid disodium salt. Oxidation of Isoleuco acid di sodium salt with ammonium dichromate under acidic condition gives Isosulfan Blue. In this method of preparation, oxidation reaction is carried out under acidic condition by using ammonium dichromate which generates desethyl impurity in large amount and it is difficult to remove this impurity by purification or recrystallization. Even after several purification desethyl impurity remain greater than pharmaceutical acceptable limit of known impurities. Further use of ammonium dichromate under acidic conditions is hazardous.

U.S. Pat. No. 7,662,992 discloses a process for preparation of Isosulfan blue, which involves sulfonation of 2-chloro benzaldehyde and replacement of chloride with an alkali metal sulphite/bisulphite at elevated temperature under closed conditions. This reaction is carried out in a parr pressure vessel equipped with overhead magnetic stirring. The reaction mixture in the vessel was stirred and heated to 170-180° C. for 5-7 hours generating 140-150 psi pressure. Another step involves condensation with N, N-diethyl aniline and urea in glacial acetic acid to obtain isoleuco acid and then oxidation of isoleuco acid with silver oxide in a polar solvent to obtain isosulfan blue acid. In the oxidation reaction large amount of silver oxide is used. In the example disclosed 2.5 molar equivalent of silver oxide is used. During oxidation considerable amount of desethyl impurity is formed, Isosulfan blue free acid was obtained by adjusting the pH to acidic and adding isopropyl ether as anti-solvent, it was then converted into sodium salt by adjusting pH more than 6.0 with sodium carbonate and then purified with aqueous Isopropyl alcohol/Acetone.

This method of preparation requires 170-180° C. temperature with generating pressure 140-150 psi which is very risky in bulk scale. Also this process involves use of large amount of costly silver oxide as oxidizing agent. This process utilized very large amount of flammable solvent like di-isopropyl ether. The oxidation under these condition leads to the formation of Des ethyl impurity thus requiring several steps of purification and results in low yield.

The yield of isosulfan blue prepared by the preceding processes particularly by that of U.S. Pat. No. 7,662,992 was below 20% and the purity of isosulfan blue obtained by following U.S. Pat. No. 7,534,911 was below 80%.

Therefore, there is a need for an improved process for preparation of isosulfan blue free of desethyl impurity and suitable for large scale production besides having better purity and yield.

OBJECTIVE OF THE INVENTION

Thus, an objective of the present invention is to provide an improved process for preparation of isosulfan blue, which is substantially free of desethyl impurity, comprising oxidation of isoleuco acid in a solvent.

Another further objective of the present invention is to provide a simple, industrially feasible and economically viable process for the preparation of isosulfan blue.

Yet another objective of the present invention is to provide an improved process for preparation of isosulfan blue without involving use of hazardous and expensive oxidizing reagent.

Yet another further objective is to provide isosulfan blue substantially free of desethyl impurity and in high yield and high purity.

Yet another objective of the present invention is to avoid over oxidized products under reaction condition.

Yet another objective of the present invention is to purification of crude isosulfan blue with reduced des ethyl impurity using the solution of inorganic or organic salt in water to archived purity as per ICH.

SUMMARY OF INVENTION

In one aspect the present invention provides an improved process for preparing isosulfan blue having formula (I)

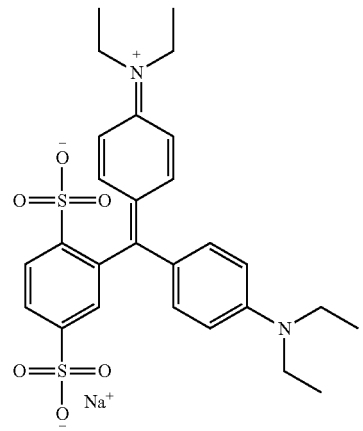

substantially free of desethyl impurity, the process comprising a step of oxidation of isoleuco acid by an oxidizing agent in a solvent.

In another aspect the present invention provides an improved process for preparation of Isosulfan blue having Formula I, substantially free of desethyl impurity, wherein

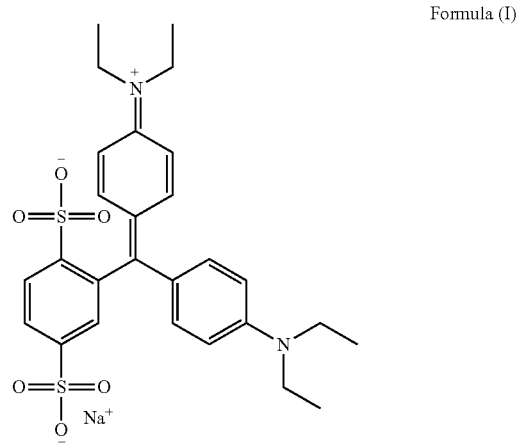

Formula (I)

the process comprises steps of:
a) oxidizing isoleuco acid with an oxidizing agent in a solvent;
b) treating isosulfan blue of step (a) with water and hydrochloric acid to provide isosulfan blue hydrochloric acid salt;
c) treating Isosulfan blue hydrochloric acid salt of step (b) with water and an inorganic salt to provide crude isosulfan blue;
d) treating crude isosulfan blue of step (c) with water and an inorganic or an organic salt.

In a further aspect the process for preparation of isosulfan blue comprises oxidation of isoleuco acid of formula (II) with an oxidizing agent in a solvent to obtain isosulfan blue of the formula (I) which is purified by dissolving the isosulfan blue in a solvent and then adding anti-solvent in which isosulfan blue is insoluble to obtain pure isosulfan blue.

DETAILED DESCRIPTION OF THE INVENTION

The present invention provides isosulfan blue of the formula (I) substantially free from desethyl impurity. The improved process provides a highly pure isosulfan blue having less than 0.15% of the desethyl impurity (represented by formula-III). The purity of the isosulfan blue is at least 99.8%.

As discussed in the background section, the oxidizing agent used in the prior art formed large amount of desethyl impurity, which was difficult to remove by purification. Even after several crystallization steps, it was difficult to reduce the level of desethyl impurity to the pharmaceutical acceptable limit of 0.15% for known impurities.

In the present invention, it was surprisingly found that a mild, non-toxic, cheap, commercially available oxidizing agent produces very less amount of desethyl impurity and such impurity can be easily reduced by purification.

The process comprises oxidation of the isoleuco acid in a solvent (II). The oxidation of isoleuco acid (scheme-1) is carried out by using permanganate salts such as potassium permanganate, sodium permanganate, ammonium permanganate, calcium permanganate, silver permanganate preferably sodium and potassium permanganate is used more preferably sodium permanganate is used. The sodium permanganate commercially available as solution may also be used. Solution of sodium permanganate may be in water or solvent.

The mole ratio of oxidizing agent varies from 1.0 to 2.0 mole with respect to isoleuco acid, preferably 1.1 mole of oxidizing agent is used.

The solvent which can be used is selected from the group of alcohols, ketones, nitriles, esters and water. Preferably alcohols and nitriles or mixture thereof is used. The alcohols are selected from methanol, ethanol, butanol, tertiary butanol or mixture thereof. Nitriles selected from acetonitrile, propionitrile and ketones selected from acetone, methyl ethyl ketone, methyl isobutyl ketone. Esters selected from the methyl acetate, ethyl acetate, propyl acetate etc preferably a mixture of solvents consisting of alcohol and nitriles is used, more preferably a mixture of methanol and acetonitrile is used.

The temperature at which oxidation is carried out is −25° C. to 25° C., preferably at −15° C. to 5° The progress of the oxidation reaction can be monitored by HPLC. After the reaction is over, the solution thus obtained, which is blue in colour is filtered through hyflow bed. The filtrate thus obtained is distilled and water is added to the residue to get clear solution. To the clear solution an anti-solvent like acetone or tertiary butanol is added and after stirring for 2.0 hrs, solid was obtained, it is further stirred for 2.0 hrs, which was filtered and dried. The desired salt like potassium, sodium can be obtained by acidification and basification to obtain desired salt of isosulfan blue. Preferably sodium salt of isosulfan blue is prepared.

The isoleuco acid used for the preparation of isosulfan blue can be prepared employing methods known in the prior art (for example scheme-1). The isoleuco acid can be prepared by treating 2-chloro benzaldehyde with a sulphonating agent, selected from 20% oleum at below 80° C. for 5-6 hrs. Then the reaction mixture is cooled and poured into crushed ice followed by addition of sodium chloride to obtain yellowish coloured solid which upon filtration gives 2-chloro benzaldehyde-5-sulfonic acid.). Subsequently it was dissolved in water and neutralized with sodium carbonate solution to a pH of about 6 to 7 and further reacted with alkali metal selected from sodium sulphite and sodium bisulphite at 100-105° C. for 6 to 7 hours. The reaction mixture is then cooled to 65-70° C. and distilled off water under vacuum to get residue and charge methanol to obtain cream coloured solid which upon filtration gives benzaldehyde-2,5-di sulfonic acid disodium salt.

Benzaldehyde-2,5-di sulfonic acid disodium salt is further reacted with N,N-di ethyl aniline and urea in glacial acetic acid at 115-120° C. for 5-6 hrs then cool reaction mixture to 25-35° C. and methanol is added to obtain light bluish coloured solid which upon filtration and slurry wash with water gives pure isoleuco Acid.

Scheme 1

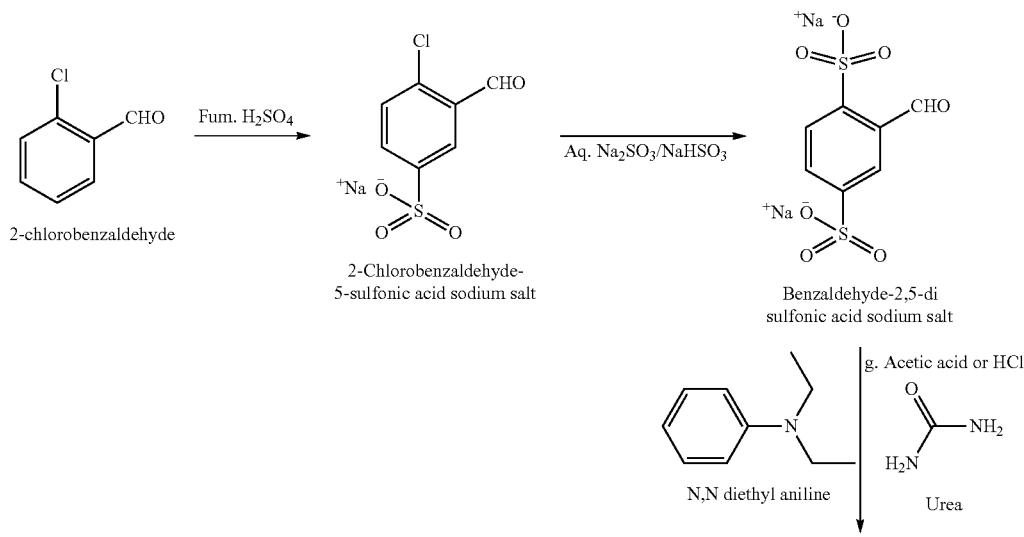

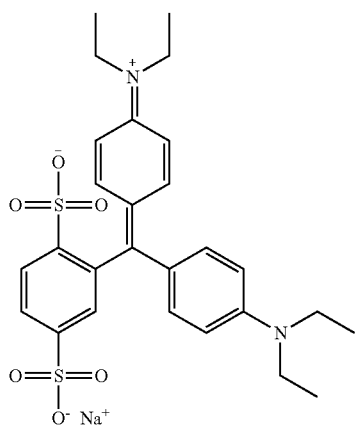

Iso Sulfan Blue

← Sodium or potassium permanganate / Methanol, Acetonitrile Sodium Carbonate

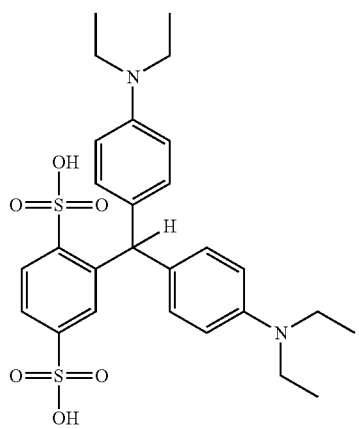

Isoleuco Acid

In another embodiment of present invention, the isosulfan blue obtained is treated with water and hydrochloric acid to obtain isosulfan blue hydrochloric acid salt. The reaction is carried out at a temperature ranging from 15 to 40° C., preferably at 20 to 35° C., more preferable 25-33° C. for about 1 to 2 hours.

The isosulfan blue hydrochloric acid salt so obtained is treated with inorganic salt in water. The inorganic salt is selected from sodium, potassium, ammonium salts such as carbonate, bicarbonate, hydroxide; preferably sodium carbonate, sodium bicarbonate, potassium carbonate, potassium bicarbonate, ammonium carbonate, more preferably sodium carbonate.

The reaction is carried out in a solution; wherein the concentration of the inorganic salt is up to 30% in water. The pH ranges from 6 to 7.5, more preferably from pH 6.5 to 7.0. The crude isosulfan blue so obtained has a purity 99.0% and des-ethyl impurity 1.0%.

The crude isosulfan blue is subjected to a further step of purification using an inorganic or organic salt in water. The inorganic or organic salts are selected from sodium, potassium, ammonium salt like carbonate, bicarbonate, hydroxide, acetate; preferably sodium carbonate, sodium bicarbonate, sodium acetate, potassium carbonate, potassium bicarbonate, ammonium carbonate, more preferably sodium carbonate or sodium acetate. The reaction is carried out in a solution of inorganic salt having about 2% to 30% of concentration solution in water. The process purification reaction is carried out at about pH 7 to 13, more preferably pH 7.5 to 12 to give Isosulfan blue having purity of 99.8% and des-ethyl impurity less than 0.15%.

In a preferred embodiment the present improved process for preparation of Isosulfan blue as represented in Formula I, wherein the process comprises the steps of:
a) Oxidation of isoleuco acid compound of formula (II) with an oxidizing agent in an alcoholic solvents, nitriles solvent or mixture thereof at −20 to 25° C. preferably at −15 to −5° C.;
b) isosulfan blue of step (a) is treated with water and hydrochloric acid to give isosulfan blue hydrochloric acid salt,
c) Isosulfan blue hydrochloric acid salt of step (b) is treated with water and an inorganic salt in a concentration of not more than 30% to give crude isosulfan blue having purity 99.0% and des-ethyl impurity 1.0%,
d) crude isosulfan blue of step (c) is treated with water a solution of an inorganic or organic salt in water, the concentration of the salt is about 2% to 30% to provide isosulfan blue having formula I with purity greater than 99.8% having des-ethyl impurity less than 0.15%.

Throughout the description and claims the word "comprise" and variations of the word are not intended to exclude other technical features, additives, components, or steps. The content of the abstract of the present application is incorporated herein as reference.

Additional objects, advantages and features of the invention will become apparent to those skilled in the art upon examination of the description or may be learned by practice of the invention. The following examples are provided by way of illustration, and is not intended to be limiting of the present invention.

EXAMPLE-1

Preparation of Benzaldehyde-2,5-disulphonic Acid Disodium Salt 139.2 gm (0.782M) 20% oleum was charged in to a 1 L three neck RBF with overhead stirrer, dropping funnel and thermo pocket. 100 gm (0.711M) of 2-Chlorobenzaldehyde was added drop-wise between 10-20° C. The reaction mass was stirred and allowed to come to temperature 25-30° C. The reaction mass is heated to 70-80° C. and maintained for 5.0 hrs. The reaction was monitored by HPLC. After completion of reaction, quenched reaction mass in 3 L three neck RBF containing 1000 ml chilled water by maintaining temperature below 30° C. To the mass 500 gm powdered sodium chloride was added and precipitated solid was stirred for 2.0 hrs and filtered to give 550 gm wet 2-chlorobenzaldehyde-5-sulfonic acid. It was added to 1400 ml water and pH of the solution was adjusted to 7-8 by using sodium carbonate. Sodium sulfite powder 206 gm (1.634M) was then added, followed by addition of sodium bisulfite 20.6 gm (0.198M) then reaction mass was heated to 100-105° C. and maintain for 6.0 hrs. The reaction was monitored by HPLC. After completion of reaction water was distilled off under vacuum below 80° C. To the residue 500 ml methanol was added and stirred for 2.0 hrs. Filtered solid to obtain 725 g of benzaldehyde 2, 5-disulfonic acid disodium salt having HPLC Purity greater than 90.0%

EXAMPLE-2

Preparation of Isoleuco Acid 2200 ml of glacial acetic acid was charged in to a 3 L three neck RBF with overhead stirrer, condenser and thermopocket. Charged 725 gm of benzaldehyde-2, 5-disulfonic acid disodium salt then 31.62 gm Urea (0.526M) and 232 gm of N,N-diethyl aniline (1.554M) were added to the reaction mixture. The reaction mass was refluxed for 6 hours and progress of the reaction was monitored by HPLC. After completion of reaction, mass was cooled to 25-30° C. and 1320 ml methanol was added to reaction mass. Stir for 2.0 hrs, filtered the solid to obtain 750 gm wet solid. To the wet solid 750 ml water was added. Stir the solution at 20-25° C. for 2.0 hrs, filtered the solid to obtain 125 gm of isoleuco acid having HPLC Purity greater than 98.0%

EXAMPLE-3

Preparation of Isosulfan Blue 750 ml of methanol and 750 ml of acetonitrile was charged in to a 3 L three neck RBF with overhead stirrer, condenser and thermo pocket. To this 50 g (0.0914M) isoleuco acid was added. The suspension was cooled to 0-5° C. and 15.92 g (0.1006M) of potassium permanganate was added in one lot at 0-5° C. Stirred reaction mass for 2 hours and monitored by HPLC. After completion of reaction filtered the solution through hyflow bed and washed bed with 200 ml methanol. Charged filtrate in 3 L three neck RBF and distill off filtrate under vacuum at 30-35° C. The residue thus obtained was cooled to 25-30° C. and 100 ml DM water was added to get clear solution. To the clear solution slowly added 1000 ml acetone and stirred for 4 hours at 25-30° C. The solid was collected by filtration. Dry the solid under vacuum at 40-45° C. for 10-12 hrs to obtain 42 g isosulfan blue potassium salt. It was charged in 1 L three neck RBF and to the solid 504 ml methanol was added and the suspension was cooled to 15-20° C. Adjusted pH to 2.5-3.0 by using dilute hydrochloric acid solution at 15-20° C. The reaction mixture was filtered through hyflow bed and washed the bed with 126 ml methanol. Charged filtrate in 1 L three neck RBF and adjust pH to 8-9 by using sodium carbonate solution (10%) and stirred for 1 hours at 20-25° C. Distill off methanol under vacuum at 30-35° C. The residue was cooled to 25-30° C. and 84 ml DM water was added to get clear solution and to this slowly 420 ml tertiary butanol was added and stirred for 2 hours at 25-30° C. The solid was collected by filtration and dried in vacuum at 40-45° C. for 10-12 hours to obtain 36.52 g isosulfan blue sodium of the formula (I) having HPLC Purity greater than 99.0% with des ethyl impurity not more than 1.0%. The yield was about 70.23%.

EXAMPLE-4

Preparation of Isosulfan Blue 750 ml of methanol and 750 ml of acetonitrile was charged in to a 3 L three neck RBF with overhead stirrer, condenser and thermo pocket, to this 50 g (0.0914M) of Isoleuco acid was added. The suspension was cooled to 0-5° C. Added 35.6 g (0.1006M) of sodium permanganate (40% solution in water) in one lot at 0-5° C. and stirred reaction mass for 1 hour. The reaction was monitored by HPLC and after completion of reaction, filtered the reaction mass through hyflow bed and washed with 200 ml methanol. Charged filtrate in 3 L three neck RBF. Distill off filtrate under vacuum at 30-35° C. The residue was cooled to 25-30° C. and 100 ml DM water was added to get clear solution. To the clear solution slowly 1000 ml of tertiary butanol was added and stirred for 2 hours at 25-30° C. The solid thus obtained was collected by filtration. Dry the solid under vacuum at 50-55° C. for 10-12 hrs to obtain 39 g isosulfan blue (I) having HPLC Purity greater than 99.0% with des ethyl impurity not more than 1.0%. The yield was about 75%.

EXAMPLE-5

Purification of Isosulfan Blue 35 gm of isosulfan blue was charged in 1 L three neck RBF and to this 70 ml of water was added and stirred for 20 min at 25-30° C. To the reaction mass slowly 350 ml of tertiary butanol was added at 25-30° C. The precipitated solid was stirred for 2 hours at 25-30° C. The solid was collected by filtration and dried in vacuum oven at 40-45° C. for 10-12 hours to obtain 26.6 g isosulfan blue pure having HPLC Purity greater than 99.8% and desethyl impurity not more than 0.15%.

EXAMPLE 6

Preparation of Isosulfan Blue

To a solution of methanol (1000 ml, 10 vol) added isoleuco Acid (100 gm, 0.18 mole). The suspension was cooled to −15 to −10° C. Added solution of potassium permanganate (31.6 gm, 0.2 mole) in acetonitrile (1000 ml, 10 vol) in one lot at −15 to −10° C. and flushed with acetonitrile (200 ml, 2 vol). Stirred reaction mass for 1 hour. The reaction was monitored by HPLC. After completion of reaction, the solution was filtered through hyflow bed and washed bed with 200 ml methanol. Distill off filtrate under vacuum at 40-45° C. The residue was cooled to 25-30° C. Added D M water (400 ml, 4 vol) to get clear solution. Add slowly conc. HCl (40 ml) and stirred for 1 hour at 25-30° C. The solid was collected by filtration to obtain isosulfan blue hydrochloride salt. The above solid was added to D.M. water (900 ml, 9 vol) and adjusted pH 6.5 to 7.0 by using 30% sodium carbonate solution and sodium acetate. It was stirred for 1 hour at 20-25° C. The solid was collected by vacuum filtration and dry in vacuum oven at 40-45° C. for 10-12 hours. To obtain 55 g of Isosulfan blue sodium of the formula (I) having HPLC purity greater than 99.0% with des-ethyl impurity not more than 1.0%.

EXAMPLE 7

Purification of Isosulfan Blue Sodium of the Formula (I)

50 gm of isosulfan blue sodium was dissolved in 500 ml of water and stirred for 20 min. at 25-30° C. The pH was adjusted to about 7.5-12 using 2% to 30% of inorganic salt like Sodium acetate. The precipitated solid was stirred for 2 hours at 25-30° C. The solid was collected by filtration and dried in vacuum oven at 40-45° C. for 10-12 hours. 31 g of isosulfan blue pure having HPLC purity greater than 99.8% and des-ethyl impurity not more than 0.15% was obtained.

The invention claimed is:

1. A process for preparation of Isosulfan blue having Formula I, substantially free of desethyl impurity, wherein

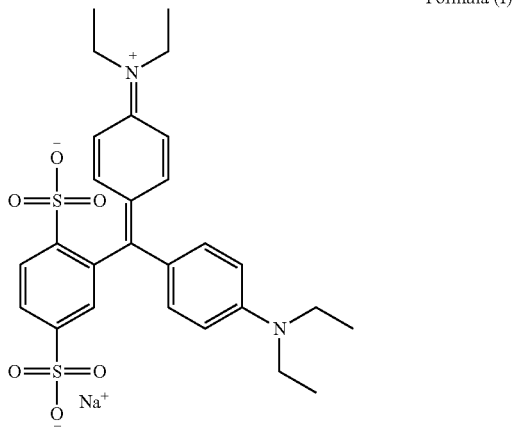

Formula (I)

the process comprises steps of:
a) oxidizing isoleuco acid by an oxidizing agent in a solvent;
b) treating isosulfan blue of step (a) with water and hydrochloric acid to provide isosulfan blue hydrochloric acid salt;
c) treating Isosulfan blue hydrochloric acid salt of step (b) with water and an inorganic salt to provide crude isosulfan blue;
d) treating crude isosulfan blue of step (c) with water and an inorganic or an organic salt.

2. The process as claimed in claim 1, wherein the oxidizing agent is selected from potassium dichromate, lead dioxide, chloranil, sodium hypochlorite, ammonium persulphate, manganese dioxide, and potassium permanganate.

3. The process as claimed in claim 2, wherein the amount of permanganate salts ranges from 1.0 to 2.0 molar equivalent.

4. The process as claimed in claim 1, wherein the solvent is selected from alcohols, ketones, nitriles and water or mixtures thereof.

5. The process as claimed in claim 4, wherein the alcohol is selected from methanol, ethanol, butanol, tertiary butanol or mixture thereof.

6. The process as claimed in claim 4, wherein, the nitrile is selected from acetonitrile and propionitrile.

7. The process as claimed in claim 4, wherein the ketone is selected from acetone, methyl ethyl ketone and methyl isobutyl ketone.

8. The process as claimed in claim 1, wherein the oxidation is carried out at a temperature ranging from −20° C. to 25° C.

9. The process as claimed in claim 1, wherein step of oxidation is followed by a step of recrystallization.

10. The process as claimed in claim 9, wherein the recrystallization comprises the steps of:
a) dissolving of isosulfan blue in a solvent; and
b) precipitation of isosulfan blue by adding an anti-solvent.

11. The process as claimed in claim 10, wherein the solvent for dissolution is water.

12. The process as claimed in claim 10, wherein the anti-solvent is tertiary butanol.

13. The process as claimed in claim 1, wherein step (b) is carried out at a temperature ranging from 20° to 35° C.

14. The process as claimed in claim 1, wherein in step (c) the inorganic salt is selected from carbonate, bicarbonate, and hydroxide salts of sodium, potassium, and ammonium.

15. The process as claimed in claim 1, wherein in step (c) the concentration the inorganic salt is about 30% in the solution.

16. The process as claimed in claim 1, wherein in step (c) the reaction is carried out at pH 6 to 7.5.

17. The process as claimed in claim 1, wherein in step (d), wherein the inorganic or organic salt is selected from carbonate, bicarbonate, hydroxide, and acetate salts of sodium, potassium, and ammonium.

18. The process as claimed in claim 1, wherein step (d) is reaction carried out at pH 7 to 13.

19. The process as claimed in claim 1, wherein in step (d) the concentration of the inorganic salt is about 2% to 30% in solution.

20. The process as claimed in claim 1, wherein the isosulfan blue contains less than 0.15% of desethyl impurity.

21. The process as claimed in claim 1, wherein the purity of isosulfan blue is greater than 99.8%.

22. Isosulfan blue of formula (I) prepared by the process as claimed in claim 1, wherein the isosulfan blue contains less than 0.15% of desethyl impurity.

23. The process as claimed in claim 1, wherein in step (c) the inorganic salt is selected from sodium carbonate, sodium bicarbonate, potassium carbonate, potassium bicarbonate, and ammonium carbonate.

24. The process as claim in claim 1, wherein in step (d), wherein the inorganic or organic salt is selected from sodium carbonate, sodium bicarbonate, sodium acetate, potassium carbonate, potassium bicarbonate, and ammonium carbonate.

25. The process as claimed in claim 1, wherein in step (c), the reaction is carried out at pH 6. to 7.5.

26. The process as claim in claim 1, wherein step (d) is reaction carried out at pH 7.5 to 12.

* * * * *